March 26, 1957  P. VANDERVOORT  2,786,858
METHOD FOR THE REFINING OF OILS AND FATTY SUBSTANCES
Filed Dec. 11, 1952  5 Sheets-Sheet 5
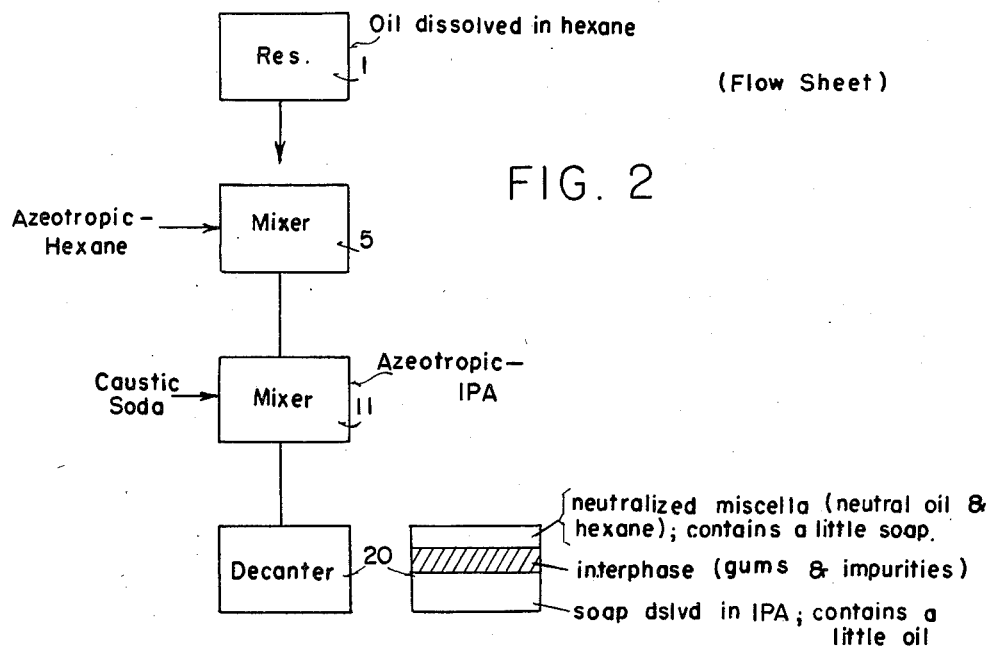
FIG. 2
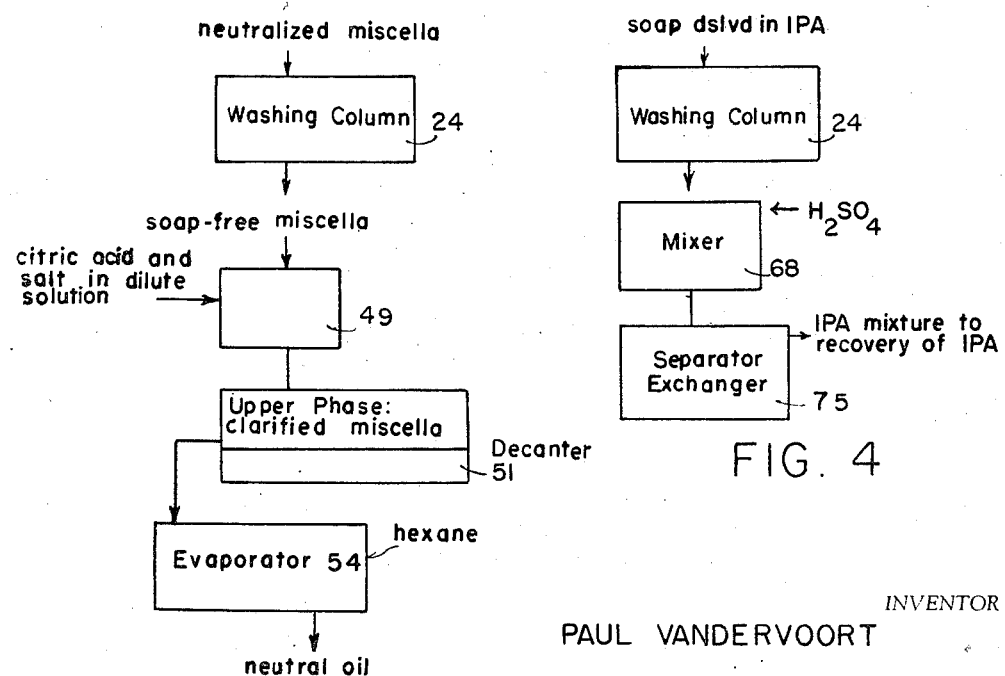
FIG. 3
FIG. 4
INVENTOR
PAUL VANDERVOORT
BY Wenderoth, Lind and Ponack
ATTORNEYS United States Patent Office 2,786,858
Patented Mar. 26, 1957

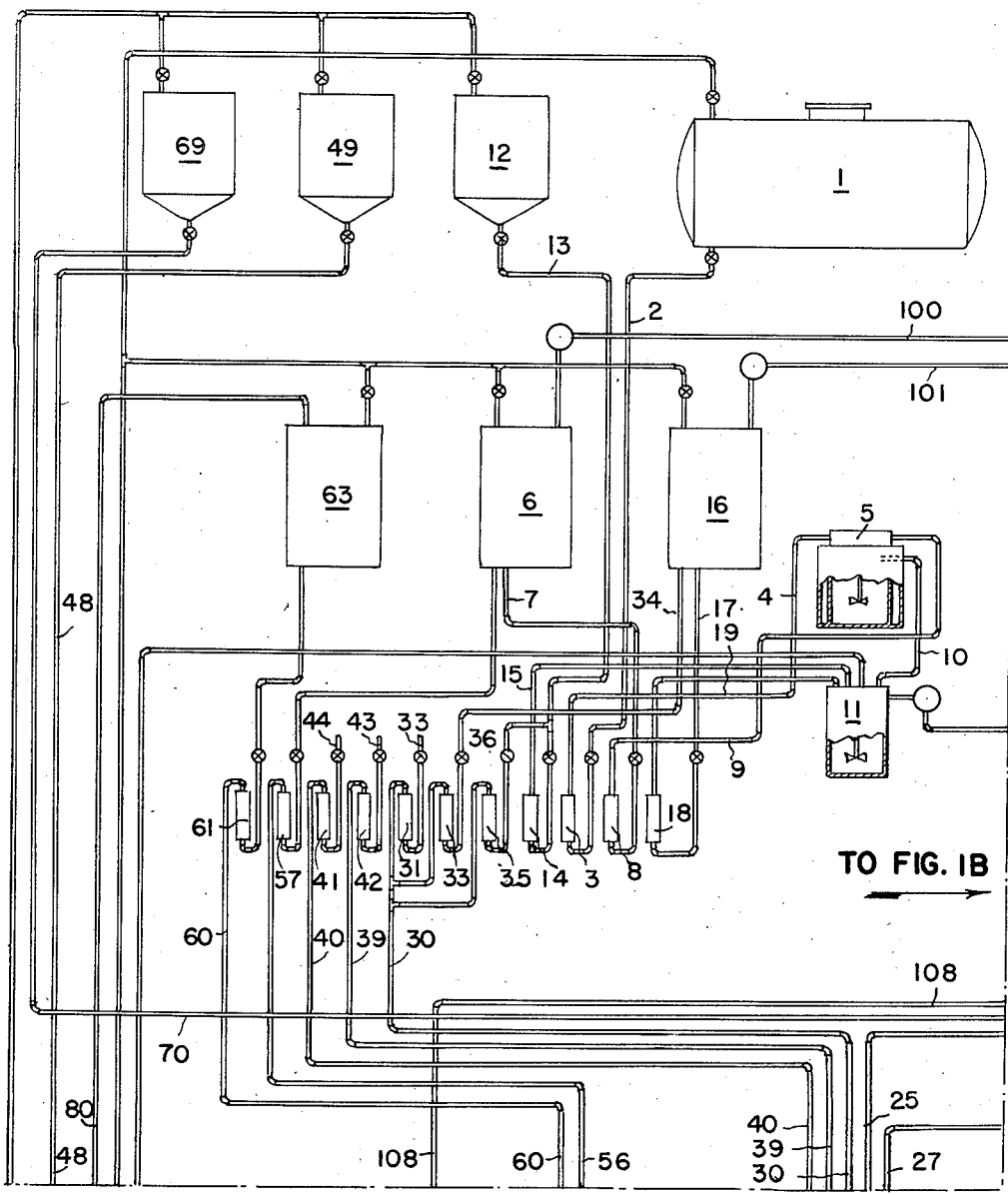

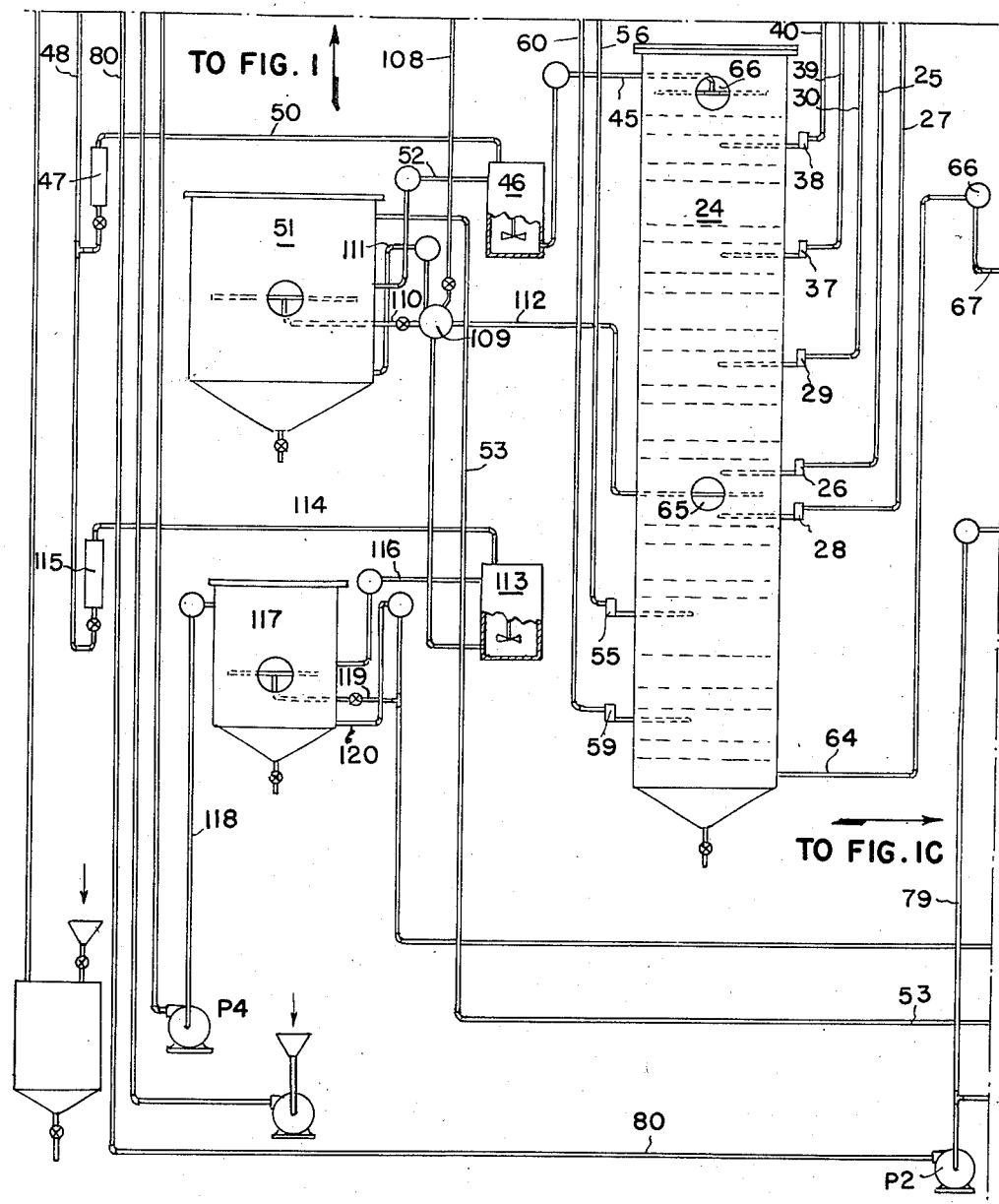

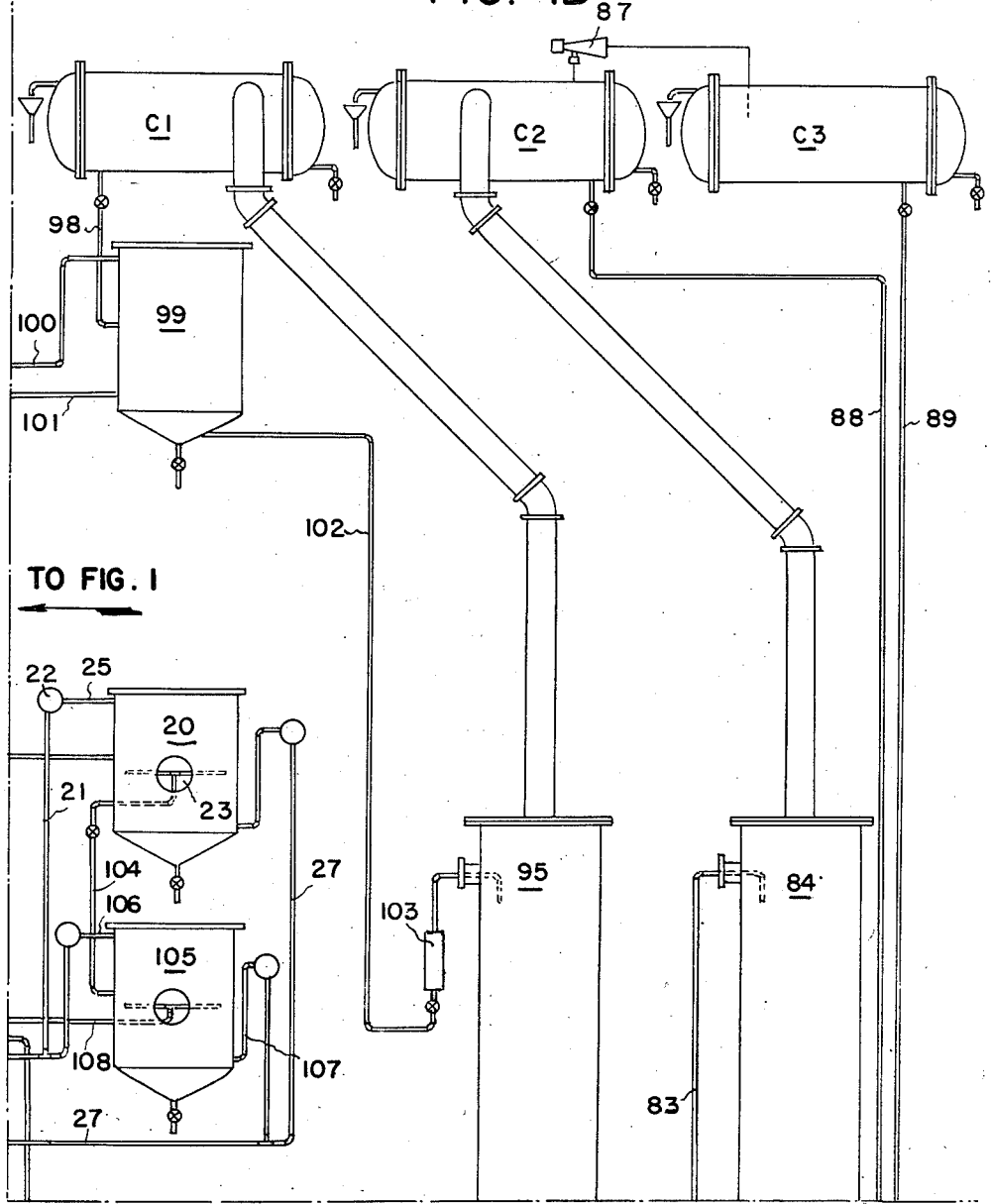

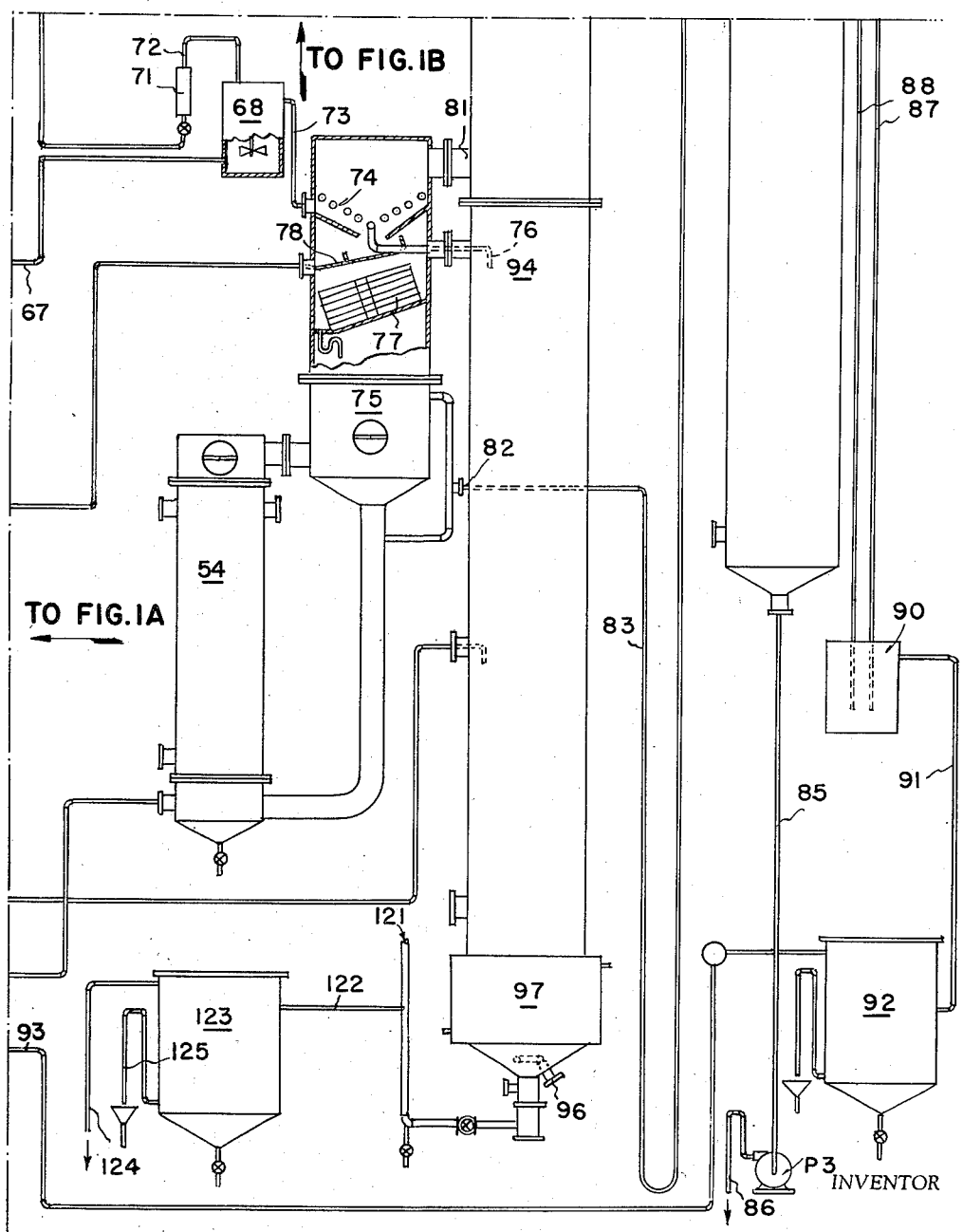

2,786,858

METHOD FOR THE REFINING OF OILS AND FATTY SUBSTANCES

Paul Vandervoort, Merksem-Antwerp, Belgium, assignor to Extraction Continue de Smet, Antwerp, Belgium, a Belgian society Application December 11, 1952, Serial No. 325,289

Claims priority, application Luxemburg December 13, 1951

9 Claims. (Cl. 260—426)

The present invention relates to a process for the refining of oils and fatty materials, especially vegetable oils and fats, by treatment in solvent media, in which process the crude miscella, i. e. the crude solution of oils and greases, is admixed with a neutralizing agent. Various refining processes of this type are known. However, the process according to the present invention is differentiated from known processes, notably by its high yield, by the fact that it makes possible the treatment of miscella of different concentrations and acidities, and by the fact that it permits an economic recovery of the solvents employed.

To this end, the crude miscella and the neutralizing agent are mixed with a third solvent, i. e. with a liquid which dissolves partially in the solvent of the miscella and in the neutralizing agent, after which the phases of the thus-obtained mixture are separated, for example by decantation.

In one particular embodiment of the invention, isopropyl alchol is used as the third solvent.

In a preferred embodiment of the invention, the upper phase, resulting from the decantation and containing miscella, is washed with water, after which the washed phase is treated with a solution of an electrolyte and the resultant mixture subjected to a second decantation, the upper phase of this second decantation being then subjected to an evaporation.

In the preferred embodiment of this invention, the lower phase resulting from the decantation of the mixture of crude miscella with neutralizing agent and third solvent is washed with a liquid containing solvent for the miscella and third solvent, after which this washed phase is treated with a strong acid and the thus-obtained mixture subjected to evaporation.

The invention relates also to the apparatus for carrying out the aforesaid process. Other details and particularities of the invention will be evident from the description of a process for the refining of vegetable oils and greases and of a plant for carrying out such process, hereinafter given by way of non-limitative example and with reference to the accompanying drawings.

The drawing proper (Figs. 1A, 1B, 1C and 1D), which in effect constitutes a single figure, represents a diagrammatic installation according to the invention. The drawing also comprises a flow sheet wherein Fig. 2 summarizes the first stage of the treatment according to the invention, Fig. 3 summarizes the treatment of the neutralized miscella obtained from the first treatment stage, and Fig. 4 summarizes the treatment of a further product of the first treatment stage.

In the said installation, the crude oil dissolved in a solvent, is treated. The solution of oil in the said solvent, for example in hexane, is herein termed "miscella." When the dissolved oil is still crude, i. e. not refined, the solution containing the dissolved oil is termed "crude miscella." This crude miscella can be obtained in several different ways, either by direct extraction with the solvent for the oil contained in the oleaginous grain or vegetable material, or by dissolving in hexane or another solvent the oil obtained from the said oleaginous source material by means of presses. The crude oil contains fatty acids, impurities, grain debris, gums, resins, coloring matters and, sometimes, appreciable quantities of phosphatides. All these materials, which impart to the oil a color and taste which render it unfit for consumption, have to be eliminated by the refining treatment.

*Refining in solvent media*

The crude oil contained in reservoir 1 (crude oil reservoir) is supplied to the mixer 5 by means of conduits 2 and 4 and the feed-meter 3. This mixer 5—provided with a heating coil—is also supplied with a mixture of pure solvent and mixed solvent (this mixture being hereinafter termed "azeotropic-hexane") contained in reservoir 6 (azeotropic-hexane reservoir) through the medium of conduits 7 and 9 and feed-meter 8. The feed-meters 3 and 8 and the heating coil of the mixer 5 make it possible to vary the concentration and temperature of the miscella. The latter leaves the mixer 5 through conduit 10 leading to mixer 11.

The installation according to the present invention makes it possible to treat miscellas of greatly variable concentrations and acidities. It is possible to treat a miscella of a concentration amounting to 40% of oily material, the acidity of which may be as high as 80%. By way of example, let us take a miscella containing about 20% by weight of oil, said oil having an acidity of 4%, expressed as free oleic acid. The quantity of caustic soda which is added depends on the acidity of the miscella and can be ascertained by titration; it should be enough to neutralize the miscella, but it is advisable to use an excess of about 10%. The concentration of the caustic soda can vary within very wide limits. Caustic soda solution of a concentration of 20° Baumé is quite suitable. In the illustrated case, one liter of aqueous caustic soda solution of a concentration of 20° Bé. and 15 liters of isopropyl alcohol are added for each 100 kg. of miscella of 20% concentration by weight and of 4% acidity.

The crude miscella is treated in mixer 11 with the caustic soda which is supplied from the caustic soda reservoir 12 through conduits 13 and 15. A feed-meter makes it possible to regulate the feed of caustic soda necessary for the neutralization of the crude miscella. There is also added to the mixer 11 a mixture of third solvent and water (hereinafter designated "azeotropic-IPA") contained in the reservoir 16 (azeotropic-IPA reservoir), this mixture being fed through conduits 17 and 19 and feed-meter 18.

In order to bring out the role of the alcohol, there follows a description of experiences encountered prior to the practical realization of the present invention.

When a dilute solution of a base (for example NaOH) is added to a crude miscella and when the thus-obtained mixture is agitated, there results a neutralization of the fatty acids, decanting in the form of soap which entrains gums, phosphatides, etc. This decantation is slow and incomplete, the miscella is badly discolored, and there remains between the two phases a substantial intermediate layer without distinct separation.

When the concentration of water in this system is reduced—the quantity of caustic soda remaining constant and sufficient to neutralize the fatty acids—the soap which forms becomes granular and decants more rapidly. The color is improved but there still remains an intermediate layer which prevents quantitative separation.

Finally, when very concentrated caustic soda is employed, the whole mass assumes the form of a gel. There is only a single phase and therefore there is no question of a separation.

Since it is difficult, under these conditions, to suppress by mechanical means the physical adsorption of oil by the soap, the addition of caustic soda to the crude miscella does not bring about an economic refining of the oil.

According to the present invention, the desired separation is brought about by the use of a third solvent, for example the alcohol, i. e. a liquid which dissolves partially in the solvent for the miscella and in the water. The soap goes into real solution in the diluted alcohol, the intermediate layer disappears, and there appears a very distinct line of separation, at which line there accumulate the gums and the impurities of the oil.

In order to carry out the process with a good yield, it is necessary to avoid all saponification of the neutral oil. Such saponification takes place in the cold with primary alcohols and increases in rapidity, the shorter the aliphatic chain of the alcohol and the lower the concentration of water in the system. It does not take place with dilute secondary alcohols in the cold. Among the third solvents which can be employed are, for example, the alcohols, ketones, ketone-alcohols, glycols and glycerol, the short aliphatic chain secondary alcohols being particularly suitable; isopropyl alcohol complies with these last-mentioned requirements.

The crude miscella, mixed with caustic soda in the presence of third solvent, is led through conduit 21 for decantation in decanter 20. A window in conduit 22 makes it possible to control regular feed and to take samples to be sure of the neutrality of the miscella. The decantation produces in decanter 20 two continuous phases and an interphase. The upper phase contains essentially the neutralized miscella, the lower phase consists primarily of soap dissolved in third solvent. The interphase, located at the point of separation between miscella and soap, is constituted by gums and impurities of the oil. This intermediate layer is visible through window 23 in the outer wall of decanter 20; it is subjected to a special treatment. The upper phase of the decanter 20 is constituted essentially by neutral oil and hexane. However, because of the partial solubility of dilute isopropyl alcohol in hexane, the upper phase also contains a small amount of soap dissolved in the alcohol. Similarly, in the lower phase, constituted by soap dissolved in dilute isopropyl alcohol, there is present a small amount of oil due to the solubility of the hexane in isopropyl alcohol. These considerations, which can be confirmed by analysis, show that notwithstanding a perfect separation of the two phases, a little soap is normally present in the miscella and, similarly, a little oil is found in the lower phase. In order to effect a total separation of the fatty acids and neutral oil, it is thus not enough to separate the two phases in decanter 20, but it is necessary to extract the neutral oil from the soap and to extract the soap from the neutral miscella. The foregoing steps are summarized in flow sheet form in Fig. 2 (flow sheet). The extraction of these constituents is effected by washing in washing column 24 (see flow sheet, Figs. 3 and 4). This column is of the plate type provided with packing and operates by the counter-current principle.

The miscella from decanter 20 is brought through conduit 25 to injector 26 located at the middle of washing column 24; similarly, the soap from decanter 20 is brought through conduit 27 to injector 28. The miscella, containing some soap, entering at 26, ascends progressively in the washing column and encounters first a dilute solution of isopropyl alcohol injected at 29 and uniformly distributed by the intermediate distributor plate. Branched onto conduit 30—which supplies the dilute alcohol—are feed-meters 31 and 32, respectively connected by conduits 33 and 34 to a water pipe line and to azeotropic-IPA reservoir 16. This arrangement makes it possible to control at will the dilution of the mixed solvent at injector 29. In addition, a feed meter 35, connected by conduit 36 to the caustic soda conduit 13, assures a regulable supply of caustic soda at injector 29, through the said conduit 30.

By the injection of caustic soda, a high pH is assured at the intermediate zone of the washing column 24, in order to maintain a suitable decantation of the phases. By the action of the liquid injected at 29 and distributed by the intermediate plates, the miscella is progressively freed from the soap contained therein. In order to render this washing complete, water is injected at 37 and 38, respectively connected by conduits 39 and 40 to feed-meters 41 and 42, the water being supplied through conduits 43 and 44. The miscella, completely freed of soap, leaves the column through conduit 45. The miscella of neutral oil is then treated in mixer 46 by an electrolyte consisting of citric acid and salt in dilute solution. A feed-meter 47 connected by conduit 48 to the electrolyte reservoir 49 makes it possible to regulate the supply of electrolyte in conduit 50 leading to mixer 46. This washing, which is essentially a degumming in acid medium, is for the purpose of precipitating gums which do not coagulate in basic medium. After a decantation in decanter 51, to which the clarified miscella is brought by conduit 52, the upper phase of this decanter flows into conduit 53 which leads to the evaporator 54.

The soap, which through conduit 27 is introduced by injector 28 near the middle of washing column 24, descends in the latter where it encounters first a mixture of azeotropic hexane injected at 55 and supplied by conduit 56 of the feed-meter 57 which is itself connected by 58 to the azeotropic hexane reservoir 6.

As in the washing of the miscella, here again a washing is carried out with the pure solvent which is injected at 59 and is supplied by conduit 60 via the feed-meter 61 and conduit 62 of the hexane reservoir 63.

As before, the distribution of these liquids is effected by means of distributor plates provided with packing.

In order to avoid the introduction of air which may be contained in the different liquids introduced by the injectors 26, 28, 29, 37, 38, 55 and 59, the latter are provided with a de-aerating receptacle. The aeration conduits, not illustrated on the drawings but merely designated by a small arrow, come together in a collector connected to a condenser, a freezing-unit or a recovery device of the active carbon type (not shown).

The purpose of the washing of the soap by the azeotropic hexane and then by pure hexane is to extract all the neutral oil therefrom. The alcoholic solution of soap leaves by conduit 64. The latter is constructed as an overflow in such manner as to maintain the separator level near the middle of window 65 of the washing column 24. A window 66—functioning as an overflow and enabling the withdrawal of samples—also makes it possible to keep the feed of soap uniform. The soap is supplied by conduit 67 to mixer 68 where, by the action of sulfuric acid, it is decomposed into fatty acids and sodium sulfate. The feed of sulfuric acid, coming from reservoir 69 and led by conduit 70 to feed-meter 71, can thus be controlled in order to assure, via conduit 72, a slight excess of acid in mixer 68. Conduit 73 brings the decomposed soap into heating coils 74 of the exchanger-separator 75 from which, after it has been brought to a suitable temperature, it discharges into the exhausting column, at 76.

The miscella coming by conduit 53 into the bottom of evaporator 54 is concentrated in the latter. The hexane is released therefrom and rids itself in separator 77 of the fine droplets of oil which it contains. A part of the hexane vapors condense on the coil-exchanger 74, heating the decomposed soap. This condensate is collected at 78; it is constituted by hexane which the pump P2 sucks through conduit 79 and delivers through conduit 80 to the reservoir 63. The uncondensed vapors penetrate at 81 into the rectification column. The neutral oil, freed of the greater portion of hexane in the evaporator, leaves the separator-exchanger at level 82 in conduit 83 which is in overflow form. This oil is sucked into the stripping column 84, the latter being under reduced pressure. Under the effect of the reduced pressure and the injection of live steam, the oil is freed of the last traces of volatile material. Pump P3 draws off the finished oil through conduit 85 and delivers it to the oil outlet 86. The vapors of water and hexane leaving the finisher 84 ascend to condenser C2. A steam injector 87 maintains the reduced pressure in the stripping column 84 and condenser C2. After condensation at C3, the condensates from C2 and C3 are brought respectively by conduits 88 and 89 into the barometric condensates reservoir 90. The hexane and water brought by conduit 91 separate in the water solvent separator 92 where the hexane runs into conduit 93 to return, via pump P2 and conduit 80, to the hexane reservoir 63.

The recovery of third solvent is realized by a special azeotropic distillation in the fractionating column. The latter is composed of an exhausting column 94 and a rectification column 95. This column is fed near the middle at two different points: at 76 by a liquid composed essentially of third solvent and at 81 by pure solvent gas. The liquid and gas come from separator-exchanger 75. At the bottom of exhausting column 94, live steam is injected at 96; a heating coil 97 is also provided in order to maintain the boiling of the liquid at the base of the exhausting column 94. At the top of the fractionating column 95, there leaves a gas of a ternary azeotropic composition: hexane-isopropyl alcohol-water. This gas condenses in condenser C1. The condensates, which are also azeotropic, have the same composition as the gas but since the azeotrope: hexane-isopropyl alcohol-water is heterogeneous, there is a separation into two liquid phases. These liquid phases are brought by conduit 98 for separation in decanter 99. The upper phase, constituted essentially of hexane and isopropyl alcohol, runs into conduit 100 and is led to the azeotropic hexane reservoir 6; the lower phase, constituted essentially of isopropyl alcohol and water, is brought by conduit 101 to the azeotropic-IPA reservoir 16.

A part of the lower phase from decanter 99 is returned to the column through conduit 102. A feed-meter 103 makes it possible to regulate the course of the azeotropic distillation.

The elimination of the impurities and of the gums involves a special system designed to give a high yield of neutral oil and of fatty acids.

These impurities are constituted by gummy matters, proteins, debris, etc. They are located primarily in the interphase of decanter 20. A smaller fraction occurs in the intermediate zone in the washing column 24, and the remainder is formed by the intermediate layer in decanter 51. The intermediate layer of decanter 20 is withdrawn in continuous manner through conduit 104 leading to decanter 105. This purge necessarily entrains some neutral miscella and soap. Since the purge flow is inconsiderable, advantage is taken of a relatively long stay in the decanter 105 to separate the gums of the continuous phases of miscella and soap which, through the medium of conduits 106 and 107, join identical phases coming respectively from 25 and 27. As for the intermediate layer of decanter 105, this is withdrawn to collector 109 through conduit 108. The collector 109 receives, in addition to the gums from decanter 105, the interphase and the lower acid phase from decanter 51—withdrawn respectively through conduits 110 and 111; it also receives the intermediate layer from the washing column 24 brought by conduit 112. The liquids of the windowed collector 109 are treated in the mixer 113 with acid electrolyte brought by conduit 114 of feed-meter 115 which is connected to conduit 48. The electrolyte causes the coagulation of the gums and gives rise to the decomposition of the entrained soap. As a matter of fact, there results a resolution of the phases which are brought by conduit 116 to decanter 117, where these phases separate. The upper phase is a misceella constituted by neutral oil entrained during the purges and includes fatty acids resulting from the decomposition of entrained soap. This upper phase is brought by conduit 118 to pump P4 which feeds it to mixer 11 in order to re-neutralize it.

The purpose of the re-neutralization is to take care of the entrainments of neutral oil and soap which may have formed during the purges. Being freed of gums precipitated in acid medium, and therefore presenting a greatly reduced volume in the interphase of decanter 117, the miscella of neutral oil and fatty acid does not introduce further impurities during the re-neutralization in the mixer 11, thus assuring a high yield.

The gums of the intermediate layer of decanter 117, as well as of the lower phase of this same decanter, are withdrawn respectively through conduits 119 and 120 to the base of the exhausting column 94, which expels volatiles therefrom. At the base of the exhausting column, there is thus, on the one hand, the fatty acids resulting from the decomposition of the soaps passing out at 76, and on the other hand the gums resulting from the purge of decanter 117. By the combined action of live steam, bringing about boiling, and of electrolyte (excess sulfuric acid, citric acid, sodium sulfate), the gums coagulate in a form which is no longer soluble or which no longer forms a stable emulsion with the fatty acids. Overflow at 121 withdraws proportionately a mixture of fatty acid, gums and electrolyte to decanter 123, through overflow conduit 122. Because of the presence of hot electrolyte, the fatty acids separate rapidly in a homogeneous phase flowing to conduit 124 from which they are withdrawn. Since the gums decant very slowly, they are withdrawn by residual water, forming electrolyte, through conduit 125.

Having thus disclosed the invention, what is claimed is:

1. In a process for refining oils and fatty materials by solvent extraction, which comprises the steps of admixing the crude miscella, in the form of a solution of the crude material to be refined, with a neutralizing agent and with isopropyl alcohol which dissolves partly in the solvent of the miscella and partly in the neutralizing agent, separating the resultant layers by decantation, said layers comprising an upper layer consisting chiefly of neutralized miscella, a lower layer consisting chiefly of soap dissolved in isopropyl alcohol, and an interphase layer consisting essentially of gums and impurities, washing the upper and lower phases resulting from said decantation with water and with a liquid containing the solvent of the miscella and the isopropyl alcohol, the features of carrying out the said washings in a column through which the said phases pass in countercurrent to said water and said liquid respectively, passing the water after it has served for washing the said upper phase through the said column simultaneously with the lower phase resulting from said decantation, and passing the poor miscella resulting from the washing of the lower phase through the said column simultaneously with said upper phase.

2. A process according to claim 1, wherein the mixture comprising the crude miscella, neutralizing agent and isopropyl alcohol is introduced into a first decanter from which the aforesaid resultant upper and lower phases are continuously withdrawn, and the aforesaid phase between the said upper and lower phases is withdrawn to a second decanter, the upper and lower phases which form in the second decanter being then added to the corresponding phases from the first decanter.

3. A process according to claim 2, wherein the upper washed phase containing soap-free miscella is treated with a solution of citric acid and salt, and the mixture thus obtained is subjected to decantation to form an upper phase, a lower phase and an intermediate phase, after which the upper phase from the latter decantation is evaporated, while the lower phase from said latter decantation is washed with a strong acid and is then evaporated.

4. A process according to claim 3, wherein the intermediate layer which forms in the second aforesaid decanter is withdrawn and is added to the lower and intermediate phases resulting from the decantation of the mixture comprising the solution of citric acid and salt, after which the resultant mixture is subjected to decantation and the upper phase resulting from this new decantation is admixed with the mixture of crude miscella, neutralizing agent and isopropyl alcohol.

5. A process according to claim 4, wherein the wash liquor obtained by the washing with the aforesaid strong acid is preheated; the gases resulting from the aforesaid evaporations are introduced at different levels into a fractionating column together with said preheated wash liquor; live steam is introduced at the base of the said fractionating column; the water obtained in the base of the said fractionating column is withdrawn while the resultant ternary azeotropic gas is led to a condenser where condensation thereof takes place; the resultant condensate is allowed to separate into upper and lower phases; a part of each of the thus-obtained last-mentioned upper and lower phases is added to the crude miscella, and a part of the thus-obtained last-mentioned upper phase is employed for washing the lower phase resulting from the mixture of crude miscella, neutralizing agent and isopropyl alcohol.

6. A process according to claim 5, wherein the lower phase and the intermediate layer resulting from the aforesaid new decantation are introduced into the fractionating column at the base thereof.

7. A process according to claim 6, wherein the mixture obtained by the addition of the aforesaid strong acid is heated in a heat exchanger by means of the gas coming from the decantation of the mixture resulting from the aforesaid addition of citric acid and salt.

8. A process according to claim 7, wherein a part of the last-mentioned gas is condensed and is used for washing the lower phase coming from the decantation of the mixture of crude miscella, neutralizing agent and isopropyl alcohol.

9. A process according to claim 5, comprising returning to the fractionating column at least a part of at least one of the phases of the condensed ternary azeotropic gas.

References Cited in the file of this patent

UNITED STATES PATENTS

| | | |
|---|---|---|
| 2,113,942 | Jones | Apr. 12, 1938 |
| 2,561,330 | Ayers | July 24, 1951 |
| 2,563,327 | Folzenlogen | Aug. 7, 1951 |
| 2,614,111 | Ayers | Oct. 14, 1952 |

FOREIGN PATENTS

| | | |
|---|---|---|
| 252,370 | Great Britain | 1927 |